Figure 1:
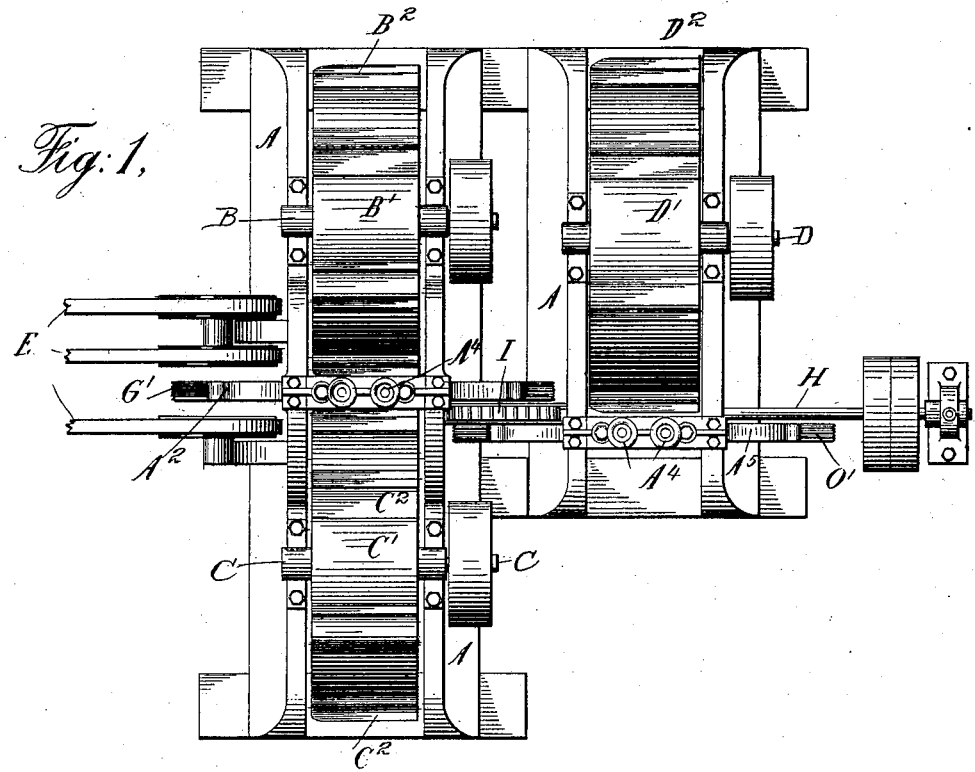

No. 753,736. PATENTED MAR. 1, 1904.
M. PRIETO.
MACHINE FOR CLEANING FIBERS.
APPLICATION FILED SEPT. 3, 1903.
NO MODEL. 2 SHEETS—SHEET 1.

Witnesses
Max B. A. Doring.
M. F. Boyle.

Inventor
Manuel Prieto
By his Attorney
Thomas Drew Stetson

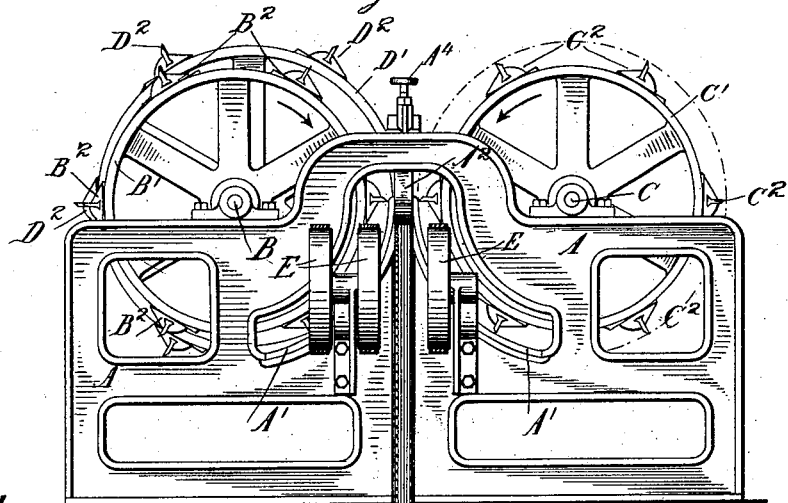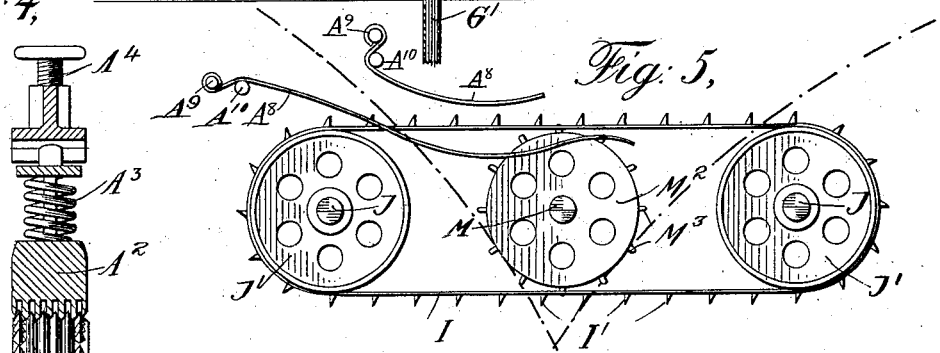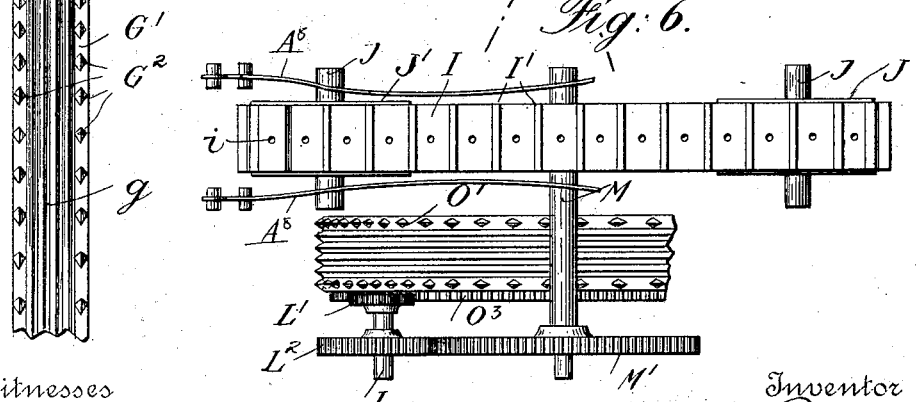

No. 753,736. Patented March 1, 1904.

UNITED STATES PATENT OFFICE.

MANUEL PRIETO, OF MEXICO, MEXICO.

MACHINE FOR CLEANING FIBERS.

SPECIFICATION forming part of Letters Patent No. 753,736, dated March 1, 1904.

Application filed September 3, 1903. Serial No. 171,765. (No model.)

*To all whom it may concern:*

Be it known that I, MANUEL PRIETO, a citizen of the Republic of Mexico, residing in the city of Mexico, in the Republic of Mexico, have invented a certain new and useful Improvement in Machines for Cleaning Fibers, of which the following is a specification.

The machine is intended more particularly for treating in a green state portions of plants having strong fibers extending lengthwise therein. It reduces to a broken and more or less pulped condition the outer covering and other material in the plant and removes it, leaving the fibers thoroughly cleaned. The plants on which my experiments have been made are a species of aloe, abundant in Central America, known as "*Agave sisalienses.*"

I will describe the invention as applied to the treatment of the large and tough leaves of such plants. Many efforts for the extraction of the fibers of this and kindred plants have been previously made by myself and others, one of the earliest examples being set forth in a patent to Demetrio Prieto, dated May 29, 1883, No. 278,668.

In my present invention I adopt the general form of machine proposed by the said Prieto in the patent issued to him dated February 17, 1891, No. 446,791. It has three sets of beaters. Each leaf is held near its mid-length and carried between two of the beaters, which simultaneously clean all of the leaf except a short portion where it is held, and by the continued motion of the same holding and feeding means the leaf which is now partially a strick of fiber is immediately afterward presented to other holding means which grasp one of its cleaned ends, (the butt-end.) The new carrier next moves with the material thus held and presents it to a third beater, which treats the previously uncleaned part and also all except the small portion thus held near the butt-end. It leaves the fiber cleaned. I have introduced important improvements in the holding and carrying means.

Instead of chains or clamps I use wheels having teeth projecting radially and surfaces between the teeth grooved circumferentially and hold the material on such wheel by relatively stationary platens. The first feeding-wheel and its platen perform their duties easily because the pull of the two beaters acting on opposite ends nearly neutralize each other. The second carrier performs a more difficult role and requires a strong pressure to obtain a reliable hold on the fiber.

I effect the transition of the material from the first feeding-wheel and its platen to the second feeding-wheel and its platen by the aid of a moving guide in the form of a narrow belt of leather or other flexible material provided with teeth which engage and carry forward the material at the same rate as the wheels carry it arranged to hold up the cleaned butt-end of the strick. I allow for this narrow belt in spacing the wheels apart. The belt carries the material horizontally across the angular space between the two feeding-wheels.

The following is a description of what I consider the best means of carrying out the invention.

The accompanying drawings form a part of this specification.

Figure 2:
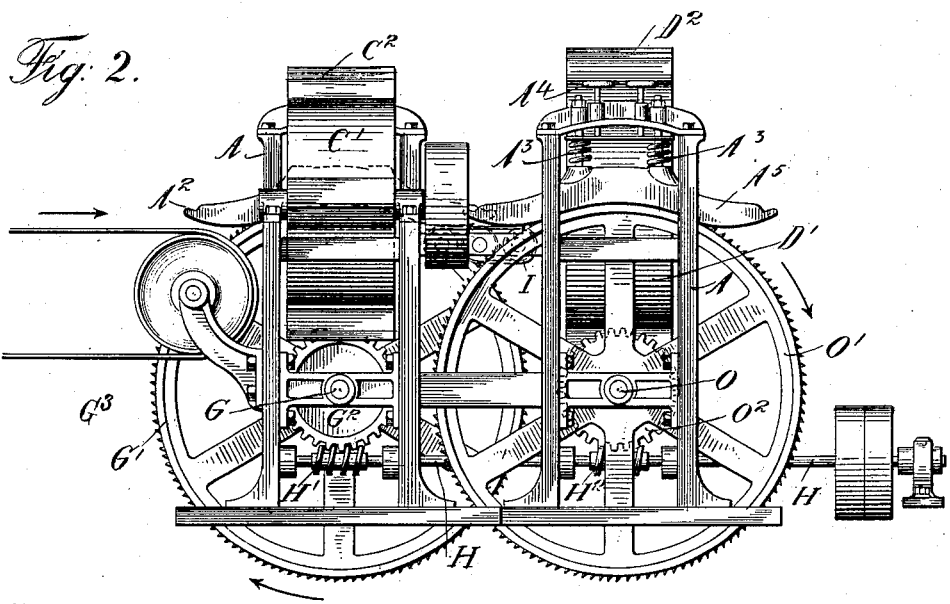

Figure 1 is a plan view. Fig. 2 is an elevation, and Fig. 3 a front elevation at right angles to Fig. 2. The remaining figures show details detached. Fig. 4 is an edge view of the upper part of the first feed-wheel and a vertical section through the presser over it. Fig. 5 is a side view, and Fig. 6 a plan view, of the guide-belt and its operating means.

Similar letters of reference indicate corresponding parts in all the figures where they appear.

A is the fixed framing, of cast-iron or other suitable material. B is a stout strongly-driven shaft running in bearings therein and carrying a drum B', with beaters $B^2$. C is a shaft arranged parallel thereto and which may be in all respects similar, except that it and its drum C' and beaters $C^2$ are arranged to revolve in the opposite direction. These sets of beaters $B^2$ and $C^2$ act simultaneously on the two ends of each leaf as it is carried past them by mechanism which will be described below.

D is a third shaft correspondingly driven and carrying a drum D', with beaters $D^2$, which act on the material after the leaves have been partly reduced to a strick of fiber and complete the cleaning operation. There are beds A' in the framing, against which the respective beaters B², C², and D² work in the ordinary and long-approved manner to effect the cleaning of the fibers in the several leaves as they are moved through the sphere of influence of the several beaters.

E E are a series of endless aprons of leather or other suitable material running slowly over pulleys. The leaves are laid on these by the attendant and are thus slowly fed to the first feed-wheel and its closely-fitting platen in the required position substantially parallel to the axis.

G is a shaft carried in bearings in the framing. It is mounted a little below and extends at right angles to the shafts B and C. On this shaft is mounted the first feed-wheel, G', receiving motion through a worm-wheel G², keyed on the same axis and receiving motion through a worm H', carried on a shaft H and turned by a belt (not shown) running on a pulley.

A² is a platen pressing strongly upon the wheel G' on its upper side. It may be considered as practically a portion of the fixed framing, although it is capable of yielding slightly by the action of stout springs A³, adjusted by screws A⁴.

The periphery of the wheel G' is grooved circumferentially, as indicated by $g$, and the adjacent surface of the platen A² is formed to match. The hollowed and grooved under surface of the platen is made smooth to allow the leaves to be traversed along under a strong pressure with the motion of the wheel. The wheel at each edge is formed with teeth radially extended and pointed, as indicated by G². (See Fig. 4.) When a leaf is received in the proper transverse position between the wheel and the platen, the teeth G² either puncture it or lie close to it, so that as the wheel revolves the teeth insure that the leaf shall move with it. Each end of the platen is curled up a little to receive and discharge the leaf easily; but the body of the platen bears continuously and strongly on the wheel during the whole passage between the first sets of beaters, B² and C², which act on the leaf to clean each end.

O is the shaft of the second feed-wheel, having firmly fixed thereon a feed-wheel O' and a worm-wheel O². This wheel receives its motion in the same manner from a second worm H³ on the worm-shaft H and may be in all respects similar to the corresponding parts which perform the first feeding operation. The platen A⁵, which presses on the second feed-wheel, O', matches thereto in the same manner as the first platen, A², matches to the wheel G'; but the springs should be adjusted to exert more pressure. In the action of the machine each leaf, after having been carried by the first feed-wheel, G', under the first platen, A², and treated by the first sets of beaters, B² C², is carried by the second feed-wheel, O', under the second platen, A⁵, being held by its previously-treated butt-end, and all the remainder of the leaf, including especially the nearly mid-length portion, which had been previously held and left untreated, is now thoroughly cleaned by the third set of beaters, D². After passing this second ordeal the fiber is delivered in a cleaned condition and may be taken away.

My experiments indicate that it is possible to transfer the partially-treated material directly from the first feed-wheel to the second without any intermediate parts; but I prefer to introduce an intermediate guide, which facilitates the operation and greatly reduces the liability to entanglement and waste. Instead of arranging the two feed-wheels G' and O' immediately adjacent to each other and almost or quite in contact I arrange them a sufficient distance apart and run between them a narrow belt I, of leather or analogous material, carrying teeth I', which may be of hard wood or metal. This belt traverses continuously at the same rate as the peripheries of the feed-wheels G' and O'. This belt receives each leaf after it has been treated by the first pair of beaters, B² C², and conveys it horizontally across from the first feed-wheel, G', to the second feed-wheel, O'. The belt I, with its teeth I', receives the butts of the leaves now partially reduced to fiber and insures their properly moving forward across the V-shaped space between the upper portions of the two feed-wheels.

The belt I is stretched between two pulleys J' J', carried on short idle shafts J, supported in fixed bearings in the required positions. These determine the oblong path described by the belt. The latter receives motion from an intermediate wheel M², provided with teeth M³, which engage in holes in the belt. This wheel is mounted on a shaft M, which is supported in fixed bearings and is driven through a gear-wheel M', keyed thereon.

On the shaft O of the second feed-wheel (they may be made in one with the second feed-wheel O') is a complete series of gear-teeth O³, which perform the easy task of giving the required gentle motion to the belt.

L is a short shaft mounted in fixed bearings on which are fixed two gear-wheels L' and L². The gear-wheel L' engages with the gears O³, and the gear-wheel L² engages with the gear-wheel M'. The sizes of these wheels should be rightly proportioned to give the belt I a motion corresponding to the peripheral motion of the feed-wheels.

I introduce simple guide-wires A⁸ in positions to aid the fiber and the untreated portions of the several leaves in being received properly on the belt I. (See Figs. 5 and 6.) They are shown as supported above the path of the leaves by being coiled around two fixed pins $A^9$ $A^{10}$, set in any adjacent fixed part and pressing elastically down, and I use also a curved wire similarly marked and held below the path of the leaves and adapted to hold the free ends of the material gently upward.

Modifications may be made without departing from the principle or sacrificing the advantages of the invention. The feed-wheels and their platens may be wider or even somewhat narrower than shown. The holes $i$ in the belt I may be bushed with metal to increase the durability of the belt. The teeth $M^3$, which by engaging in the holes $i$ aid in insuring the coincidence of movement of the partially-treated leaf with the belt, may be reduced in length and thickness. A greater or less number of the guiding-wires $A^8$, set and bent as required, may be used to aid in receiving the half-cleaned leaf correctly on the belt, or these adjuncts may be omitted entirely with some material.

Other means than the gearing $O^3$ $L'$ $L^2$ may be employed for giving the required moderate continuous motion to the belt I.

I claim as my invention—

1. In a machine for cleaning fibers of tropical plants, having two sets of beaters acting at one period to commence and one set acting at a later period to complete the treatment, a feed-wheel and platen arranged to feed the material through the early stage and another feed-wheel and platen arranged to automatically receive and to feed the material through the later stage, all substantially as herein specified.

2. In a machine for cleaning fibers of tropical plants, having two sets of beaters acting at one period to commence and one set acting at a later period to complete the treatment, a feed-wheel and platen arranged to feed the material through the early stage and another feed-wheel and platen arranged to automatically receive and to feed the material through the later stage, and means, as the guiding-belt I, arranged to aid in transferring the material from one feed-wheel and platen to the other feed-wheel and platen, combined substantially as herein specified.

3. In a machine for cleaning fibers of tropical plants, having two sets of beaters acting at one period to commence and one set acting at a later period to complete the treatment, a feed-wheel and platen arranged to feed the material through the early stage and another feed-wheel and platen arranged to automatically receive and to feed the material through the later stage, in combination with the yielding belt I having teeth $I'$ and holes $i$, and with the actuating-wheel $M^2$ with teeth $M^3$, the driving-gear $O^3$ on the second feed-wheel $O'$ and connecting gearing for insuring the correct movement of such belt, substantially as herein specified.

In testimony that I claim the invention above set forth I affix my signature in presence of two witnesses.

MANUEL PRIETO.

Witnesses:
C. LOUIS F. ROBINSON,
M. F. BOYLE.